(12) United States Patent
Becker et al.

(10) Patent No.: US 8,140,487 B2
(45) Date of Patent: Mar. 20, 2012

(54) METHODS, SYSTEMS AND SOFTWARE APPLICATIONS FOR STORING, UPDATING AND RETRIEVING KEY FIGURES

(75) Inventors: Joachim Becker, Wiesloch (DE); Michael Conrad, Rellingen (DE); Stefan Gauger, Heidelberg (DE)

(73) Assignee: SAP AG, Walldorf (DE)

( * ) Notice: Subject to any disclaimer, the term of this patent is extended or adjusted under 35 U.S.C. 154(b) by 984 days.

(21) Appl. No.: 11/318,624

(22) Filed: Dec. 28, 2005

(65) Prior Publication Data

US 2007/0078912 A1      Apr. 5, 2007

(30) Foreign Application Priority Data

Oct. 4, 2005   (EP) .................................. 05109194

(51) Int. Cl.
*G06F 7/00*     (2006.01)
*G06F 17/00*    (2006.01)
(52) U.S. Cl. ........................................ 707/688; 707/701
(58) Field of Classification Search .................. 707/688, 707/701
See application file for complete search history.

(56) References Cited

U.S. PATENT DOCUMENTS

| | | | |
|---|---|---|---|
| 5,720,023 A | 2/1998 | Putland et al. | |
| 6,944,598 B1 * | 9/2005 | Cline | 705/28 |
| 7,158,991 B2 * | 1/2007 | Kekre et al. | 707/102 |
| 2003/0163364 A1 * | 8/2003 | Piercy et al. | 705/10 |

OTHER PUBLICATIONS

Segev et al, Logical Modeling of Temporal Data, ACM, 1987, pp. 454-466.*
Elmasri et al, Partitioning of Time Index for Optical Disks, IEEE, 1992, pp. 574-582.*
Werner Dreyer et al., "An Object-Oriented Data Model for a Time Series Management System," Scientific and Statistical Database Management, 1994 Proceedings, Seventh International Working Conference on Charlottesville, VA, USA, Sep. 28-30, 1994, pp. 186-195.
EPO Communication and Search Report, dated Feb. 27, 2006 (8 pages).

* cited by examiner

*Primary Examiner* — John R. Cottingham
*Assistant Examiner* — Mariela Reyes
(74) *Attorney, Agent, or Firm* — Finnegan, Henderson, Farabow, Garrett & Dunner LLP

(57) ABSTRACT

Methods, systems and software applications are provided for storing, updating and retrieving key figures. In accordance with one embodiment, a computerized method is provided for storing values of a variable key figure over time. The method comprises storing a value of the key figure in a first data field and assigning an end date to the first data field. Further, the method includes storing a delta value of the key figure in a second data field and assigning a start date to the second data field, wherein the start date is earlier than the end date.

7 Claims, 13 Drawing Sheets

Fig. 6c

| STAGR | DATE_FROM | RBUKRS | PRCTR | MSL |
|---|---|---|---|---|
| ☐ MITARB | 13.02.2005 | 0001 | JB1 | 700,000 - |
| ☐ MITARB | 06.08.2005 | 0001 | JB1 | 200,000 |
| ☐ MITARB | 18.11.2005 | 0001 | JB1 | 500,000 |

| STAGR | DATE_FROM | RBUKRS | PRCTR | MSL |
|---|---|---|---|---|
| ☐ MITARB | 13.02.2005 | 0001 | JB1 | 500,000 - |
| ☐ MITARB | 13.04.2005 | 0001 | JB1 | 200,000 - |
| ☐ MITARB | 18.11.2005 | 0001 | JB1 | 700,000 |

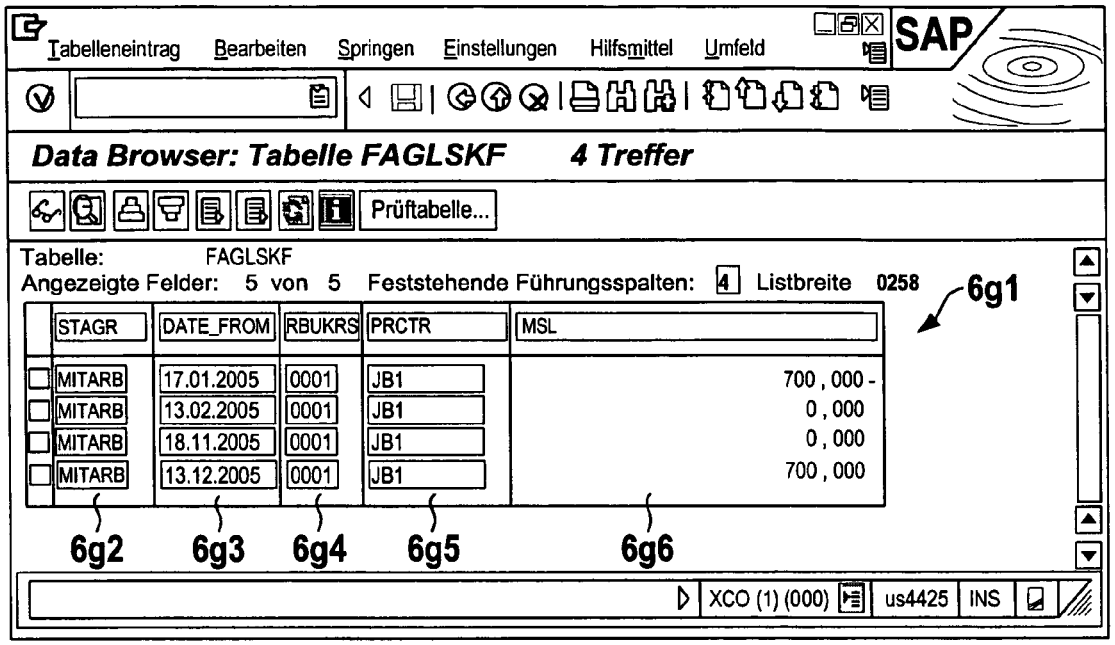
Fig. 6g
Fig. 6h
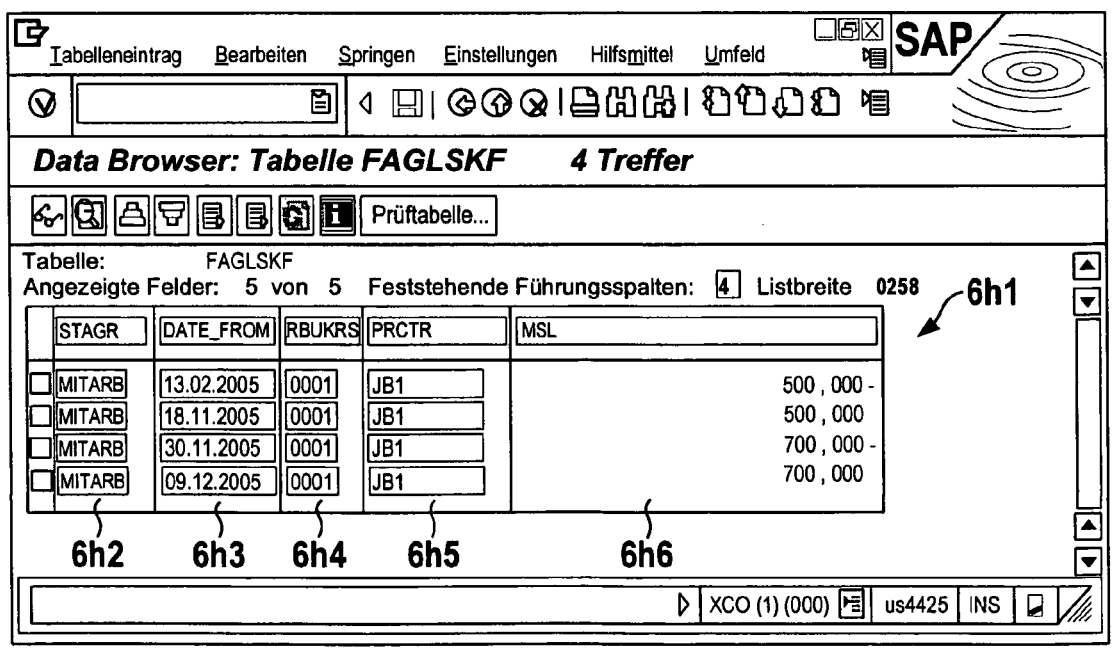

METHODS, SYSTEMS AND SOFTWARE APPLICATIONS FOR STORING, UPDATING AND RETRIEVING KEY FIGURES

TECHNICAL FIELD

The technical field of the present invention is in the area of electronic data processing. More particularly, the invention relates to methods, computer program products and systems for storing, updating and retrieving key figures, such as statistical key figures.

BACKGROUND INFORMATION

Within the meaning of this specification, the term "key figure" broadly refers to any quantifiable attribute of a tangible or intangible object that can change or vary over time. The time dependent behavior of such a key figure is usually monitored by means of computer systems. A few examples of key figures include: a temperature, a distance of two objects, a weight of an object, an area volume of a building under construction, an area under cultivation, the number of employees of a company, the area used for administration or production or for stock within an organization, the number of PC workplaces or the like within a company, market shares of products or product families, turnover per employee, personnel costs per employee, and so on. Key figures, which are used to characterize non-financial data of an organization or a sub-unit of an organization are frequently referred to as statistical key figures.

Key figures are usually stored in a computer system. This may be achieved by storing the value of the key figure at a certain point in time into a data structure or field and assigning the date of that certain point of time to the data field.

However, problems arise, if a specific key figure needs to be evaluated over different, overlapping time periods. For example, an area of cultivation may need to be evaluated for different fiscal periods of different countries. In this example, the values of the key figure have to be stored independently for each fiscal period in order to avoid inconsistencies. This may require a huge amount of storage and involve a high level of administrative work, particularly if many key figures have to be monitored for many different evaluation periods, thus stressing system performance.

With enterprise resource planning (ERP) software, it is common practice to evaluate the financial situation of an enterprise by using several parallel ledgers. For each accounting area and ledger, different overlapping evaluation periods may exist. Thus, the data of a key figure must be persisted per accounting area and per ledger, thereby increasing the data volume per ledger.

In view of the foregoing, there is a need for improved methods, software applications and/or data processing systems that can provide, for example, efficient solutions to one or more the problems described above. Moreover, there is a need for improved solutions including software applications that provide a mechanism for monitoring key figures more efficiently.

The above description is based on the knowledge of the present inventors and not necessarily that known in the art.

SUMMARY OF THE INVENTION

In accordance with the principles of the present invention, as embodied and broadly described herein, methods and systems are provided for storing, updating and retrieving key figures. Consistent with one embodiment, a computerized method is provided for storing values of a variable key figure over time. The method comprises: storing a value of the key figure in a first data field and assigning an end date to the first data field; and storing a delta value of the key figure in a second data field and assigning a start date to the second data field, wherein the start date is earlier than the end date.

As used herein, the term "delta value" broadly refers to a difference of the value of the key figure minus a previous value of the key figure. For example, if a value of a key figure in September is "100" and in October of the same year is "300", then a corresponding delta value is "200".

According to another aspect of the invention, a computerized method is provided for retrieving a value of a variable key figure at a preselectable time from a database. The database may comprise a first data field in which an end value of the key figure is stored and an end date is assigned, a second data field in which a negative value of the end value or a further end value is stored and a start date is assigned, and one or more additional data fields in which one or more differences between further end values or between further end values and the end value are stored, each of the additional data fields having a further start date assigned. The computerized method may comprise: selecting all data fields having a date assigned that is larger than the preselectable date; and summing up all values of the selected data fields to receive as a result the value of the key figure at the preselectable time.

The methods described above may be advantageously used for monitoring (e.g., storing and retrieving) statistical key figures and/or other key figures, which are constant over comparatively "long" time periods, such as over any number of weeks or months. Further, consistent with embodiments of the invention, actual values at specific times/dates prior to the end date are not stored in the computer system, but are calculated from the stored delta values and the end value, if needed.

Embodiments of the invention may provide flexibility for evaluating key figures for different time periods, although the underlying data of the key figure are only stored once in the database. As a result, a lot of storage and administrative effort may be saved in the sense that only one set of data has to be updated when a change of the value of the key figure has to be made for a specific time period.

Embodiments of the present invention, including the above-described methods, may be incorporated into enterprise resource planning software and, in particular, software for evaluating the inventory of enterprises which have to report for different fiscal periods within their organization.

Embodiments of the invention further relate to computer systems, computer programs, computer readable media and carrier signals, each comprising program code or instructions for storing, updating and retrieving key figures in accordance with, for example, the methods and embodiments disclosed herein.

Computer programs consistent with the invention can be installed as one or more programs or program modules on different hardware systems (computers or computer systems), and run separately and independently of each other, while in their entirety being capable of performing, for example, the methods and embodiments disclosed herein. The different systems may be connected in the form of a network to communicate with each other.

Additional objects and advantages of the various embodiments of the invention will be set forth in part in the description, or may be learned by practice of the invention. The objects and advantages of the embodiments of the invention will be realized and attained by means of the elements and combinations particularly pointed out in the claims. Embodiments of the invention are disclosed herein and set forth in the claims.

The various embodiments can include and/or exclude different aspects, features and/or advantages, where applicable. In addition, various embodiments can combine one or more aspects or features of other embodiments, where applicable.

It is to be understood that both the foregoing general description and the following detailed description are exemplary and explanatory only and are not restrictive of the embodiments of the invention, as claimed. The description of aspects, features and/or advantages of particular embodiments should not be construed as limiting other embodiments or the claims.

BRIEF DESCRIPTION OF THE DRAWINGS

The accompanying drawings, which are incorporated in and constitute a part of this specification, illustrate embodiments of the invention and, together with the description, explain the principles of the invention. In the drawings.

FIGS. 6a to 6h illustrate exemplary tables having entries of values of a key figure after a first updating process, consistent with embodiments of the invention.

DESCRIPTION OF THE EMBODIMENTS

Figure 1:
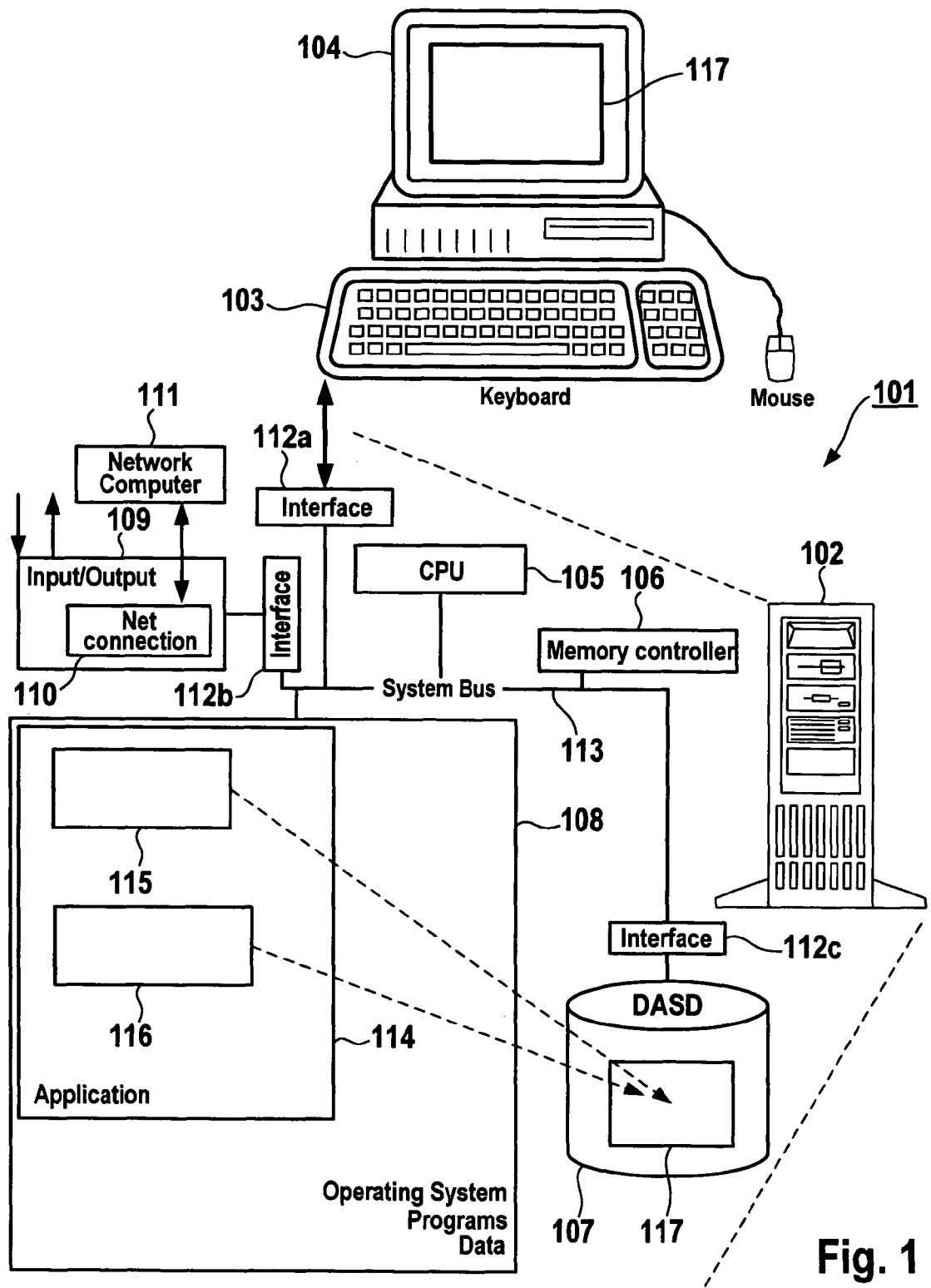
FIG. 1 is a block diagram for illustrating an exemplary computer system, consistent with an embodiment of the invention.

Within the concept of this disclosure, the terms used shall have their usual meaning in the context of the field of data processing unless defined otherwise. Particularly, a computer system broadly refers to any stand alone computer such as a PC or a laptop or a series of computers connected via a network, e.g., a network within a company, or a series of computers connected via the internet. Computer systems and programs may be closely related. As used herein, phrases such as "the computer provides" and "the program provides or performs specific actions", "a user performs a specific action" are used to express actions by a computer system that may be controlled by a program or to express that the program or program module may be designed to enable the computer system to perform the specific action or to enable a user to perform the specific action by means of a computer system.

In this context, the term "automatically" is not intended to exclude a user's interactions with the computer system in the course of processing.

The described methods and other embodiments of the invention may be implemented by means of a computer system and software which allows the creation of business software applications and which allows the use of databases or database applications and Internet applications.

The step of "assigning" data to other data may be implemented, for example, by entering both data in the same line of a table, by linking respective data fields, by making both data attributes of a common object or by other commonly known techniques.

The term "end date" as used herein broadly refers to any date assigned to an end value.

The term "start date" as used herein broadly refers to any date assigned to a delta value.

In accordance with an embodiment of the invention, the end date is set to a date that is later than the end date of a period, which shall have the respective end value and, preferably, to the largest possible system date, e.g., 31.12.9999.

In a further embodiment, the end date is set to a date, which is one or more days later (hereinafter denoted by "+1 or x") than the last day on which the key figure shall have the respective value.

In still a further embodiment, the start date is set to a date, which is one or more days earlier (hereinafter denoted by "−1 or −x") than the first day on which the key figure shall have the respective value.

In accordance with one embodiment of the invention, a computerized method is provided for storing values of a variable key figure over time, beginning from a start date to an end date, the end date being larger than the start date. The method comprises: storing a value of the key figure in a first data field and assigning the end date to the first data field; and storing a negative value of the key figure in a second data field and assigning the start date to the second data field, wherein the negative value is based on a difference between the value of the key figure stored in the first data field and a previous value of the key figure.

Embodiments of the invention are further directed to computerized methods for updating a variable key figure with a further value, wherein the key figure has a value that is stored in a first data field having an end date assigned, and wherein a negative value of the value or of a further value or a difference of a value and a further value is stored in a second data field having a start date or a further start date assigned, from a further or a still further start date to a new end date, the end date being larger than the start date, the new end date being larger than the end date and the further or still further start date being earlier than the end date. In accordance with one embodiment, the computerized method comprises: storing the further value of the key figure in a third data field and assigning the new end date to the third data field; calculating the sum of data fields having dates assigned that are between the further start date and the new end date; calculating the difference between the further value and the sum; storing the negative value of the calculated difference in a fourth data field and assigning the further or still further start date to the fourth data field; and setting the values of data fields having dates assigned that are between the further start date and the new end date to zero, whereby the new end date becomes the end date and the further value becomes the value.

Embodiments of the invention are also directed to computerized methods for updating a variable key figure with a further value, wherein the key figure has a value stored in a first data field having an end date assigned, and wherein a negative value of the value or of a further value or a difference of a value and a further value is stored in a second data field having a start date or a further start date assigned, from a new start date to a new end date, the end date being larger than the start date, the new end date being earlier than the end date and the further or still further start date being earlier than the start date. In one embodiment, the computerized method of updating comprises: storing the negative value of the further value of the key figure in a third data field and assigning the new start date to the third data field; calculating the sum of data fields having dates assigned that are between the new end date and the end date; calculating the difference of the further value minus the sum; storing the calculated difference in a fourth data field and assigning the new end date to the fourth data field; and setting the values of data fields having dates assigned that are between the new start date and the new end date to zero, whereby the new end date and the start date become further start dates and the new start date becomes the start date.

Embodiments of the invention are further directed to computerized methods for updating a variable key figure, wherein an end value is stored in a first data field having an end date assigned, and a negative value of the end value is stored in a second data field having a start date assigned, the end date being larger than the start date. In one embodiment, the computerized method of updating comprises storing a new value of the key figure as the end value in the first data field having the end date assigned, and storing the difference of the end value minus the new end value in a third data field and assigning a further start date that is between the end date and the start date or between the end date and an other further start date to the third data field.

Embodiments of the invention are further directed to computerized methods of retrieving a value of a variable key figure at a preselectable time from a database. The database may comprise a first data field in which an end value of the key figure is stored and an end date is assigned, and a second data field in which a negative value of the end value or a further end value is stored and a start date is assigned. The database may also include one or more differences between further end values or between further end values and the end value that are stored in one or more additional data fields, wherein each additional data field has a further start date assigned. In one embodiment, the computerized method of retrieving comprises selecting all data fields having a date assigned that is larger than the preselectable date, and summing up all values of the selected data fields to receive as a result the value of the key figure at the preselectable time.

In a further embodiment of the retrieving method, the value is the value of the data field to which the preselectable date is assigned if the preselectable date is the end date.

As will be appreciated by one of ordinary skill in the art, the storing, updating and retrieving methods may be adjusted to one another. For example, if the end date is chosen as an "period end date+2" or "X" in the storing and updating procedure, then a adjusted retrieving module has to add 2 or "X" days to the preselected date when selecting the data fields.

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer may include a processor for executing instructions and one or more memory devices for storing instructions and data. Generally, a computer will also include, or be operatively coupled to receive data from or transfer data to, or both, one or more mass storage devices (storage means) for storing data, e.g., magnetic, magneto-optical disks, or optical disks. Information carriers suitable for embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, embodiments of the invention can be implemented on a computer system having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or haptic feedback; and input from the user can be received in any form, including acoustic, speech, or haptic input.

Reference will now be made in detail to principles and exemplary embodiments of the invention by an explanation on the basis of a data processing process, examples of which are illustrated in the accompanying drawings. Dates are given in the format DD.MM. or DD.MM.YYYY, wherein leading zeros may be omitted.

Referring now to FIG. 1, an exemplary computer system 101 is illustrated that comprises a computer 102 and operating means 103, 104. Those skilled in the art will appreciate that methods, systems and computer programs consistent with the present invention apply equally to any computer system, regardless of whether the computer system is a complicated multi-user computing apparatus or a single user device, such as a personal computer or workstation. In the embodiment of FIG. 1, computer 102 comprises a processor 105, main memory 108, a memory controller 106, an auxiliary storage interface 112c, a general input/output interface 112b and a terminal interface 112a, all of which are interconnected via a system bus 113. Note that various modifications, additions, or deletions may be made to computer system 101 illustrated in FIG. 1, such as the addition of cache memory or other peripheral devices. Hence, FIG. 1 is presented to simply illustrate some of the salient features of computer system 101.

Processor 105 may perform computation and control functions of computer system 101, and comprise a suitable central processing unit (CPU). Processor 105 may comprise a single integrated circuit, such as a microprocessor, or may comprise any suitable number of integrated circuit devices and/or circuit boards working in cooperation to accomplish the functions of a processor. Processor 105 may execute computer programs (e.g., object-oriented computer programs) within main memory 108.

Auxiliary storage interface 112c allows computer system 101 to store and retrieve information from auxiliary storage devices, such as a magnetic disk (e.g., hard disks or floppy diskettes) or optical storage devices (e.g., CD-ROM). One suitable storage device is a direct access storage device (DASD) 107. As shown in FIG. 1, DASD 107 may comprise a hard disk drive which may read programs and data from a hard disk. Note that while embodiments of the present invention are described in the context of a fully functional computer system, those skilled in the art will appreciate that features of the present invention are capable of being distributed as a computer program product in a variety of forms, and that embodiments of the present invention apply equally regardless of the particular type of signal bearing media to actually carry out the distribution. Further examples of signal bearing media include: recordable type media such as floppy disks and CD ROMS, and transmission type media such as digital and analog communication links, including wireless communication links.

Memory controller 106, through use of a processor, is responsible for moving requested information from main memory 108 and/or through auxiliary storage interface 112*c* to processor 105. While for the purposes of explanation, memory controller 106 is shown as a separate entity, those skilled in the art will understand that, in practice, portions of the function provided by memory controller 106 may actually reside in the circuitry associated with processor 105, main memory 108, and/or auxiliary storage interface 112*c*.

Terminal interface 112*a* allows system administrators, computer programmers or other end users to communicate with computer system 101 through, for example, monitor 104, keyboard 103, mouse, trackball and the like, or through programmable workstations. Although the system 101 depicted in FIG. 1 contains only a single main processor 105 and a single system bus 113, it should be understood that the present invention applies equally to computer systems having multiple processors and multiple system buses. Similarly, although the system bus 114 of a preferred embodiment is a typical hardwired, multi-drop bus, any connection means that supports directional communication in a computer-related environment may be used.

Input/output interface 112*b* allows computer system 101 via processor 105 to communicate with general input/output means 109, including a network connection 110, for sending and/or receiving data, e.g., for a network connection with one or more further computer systems 111, or for sending or receiving of data to or from other parties. In one embodiment, a plurality of computer systems like computer system 101 can be connected via the connection 110 in the form of a network. In such a case, the network computers 111 can be used as further input/output means, including the use as further storage locations.

In one embodiment, memory 108 includes an operating system and an application 114 which includes modules for monitoring key figures according to the principles of the invention. Such modules may comprise a module 115 for storing and updating the key figures in a database 117 and a module 116 for retrieving values of the statistical key figures at preselectable dates from the data stored in the database 117.

It should be understood that memory 108 comprises "memory" in its broadest sense, and can include, for example, Dynamic Random Access Memory (DRAM), Static RAM (SRAM), flash memory, cache memory, etc. While not explicitly shown in FIG. 1, memory 108 may be a single type of memory component or may be composed of many different types of memory components. For example, memory 108 and CPU 105 may be distributed across several different computers that collectively comprise system 101. Further, it should also be understood that programs in memory 108 can include any and all forms of computer programs, including source code, intermediate code, machine code, and/or any other representation of a computer program.

In FIG. 1, the operating system stored in memory 108 may provide the basic functionality that controls the computer system 101. Operating system can comprise any suitable operating system, including commercially available operating systems such as IBM's OS/400, OS/2, Microsoft's Windows, Java and the various flavors of UNIX. The database 117 may provide the mechanism for persistently storing object data in the computer system 101, and can be any suitable form of database, including a relational database such as those commercially available from IBM, Oracle or Microsoft.

FIGS. 2*a* to 2*e* are diagrams that illustrate possible combinations of start dates and end dates during the updating of a key figure. These examples may occur when updating a key figure with a new value for a specific time period having a new start date ("$>$"=start date SD) and a new end date ("$<$"=end date ED) with respect to a already available time period 2*a*0 (to 2*e*0).

Figure 2A:
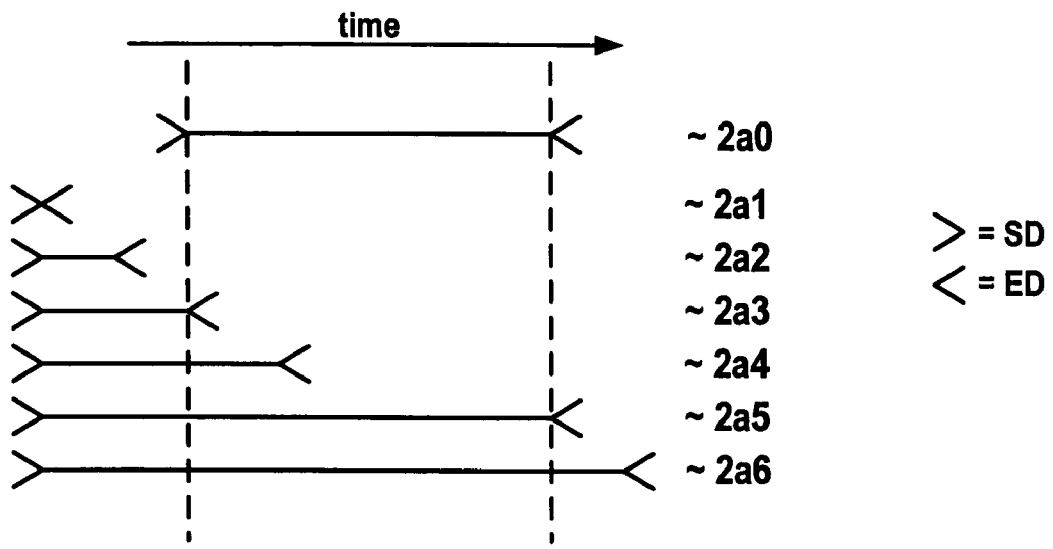
FIGS. 2a to 2e are diagrams for illustrating possible combinations of start dates and end dates relating to updating a key figure.

FIG. 2*a* shows a situation when the new start date is earlier than the previous start date. In this example, there are six possibilities for the new end date, including: the new end date is equal to the new start date, 2*a*1; the new end date is earlier than the previous start date but later than the new start date, 2*a*2; the new end date is equal to the previous start date, 2*a*3; the new end date is between the previous start date and the previous end date, 2*a*4; the new end date is equal to the previous end date, 2*a*5; and the new end date is later than the previous end date, 2*a*6.

Figure 2B:
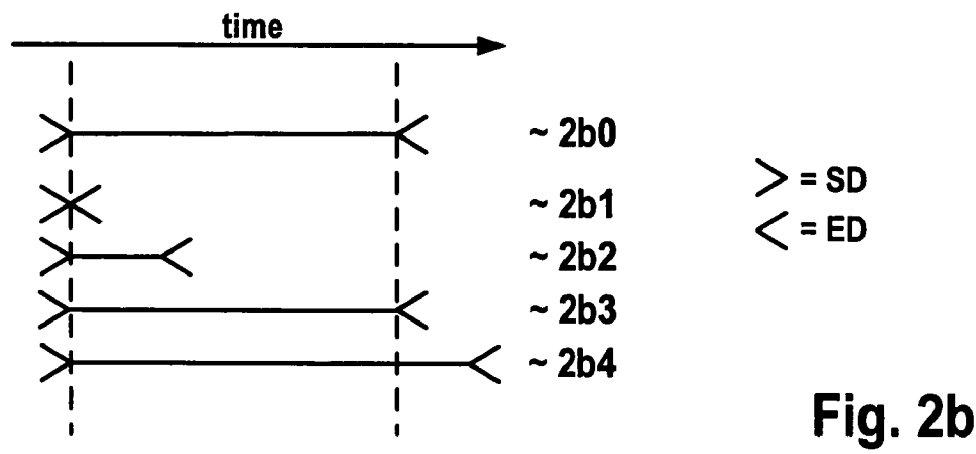

FIG. 2*b* shows the combinations that may exist when the new start date is equal to the previous start date. In a similar manner, it follows that in this case there are four possibilities, 2*b*1 to 2*b*4, for the new end date, as shown in FIG. 2*b*.

Figure 2C:
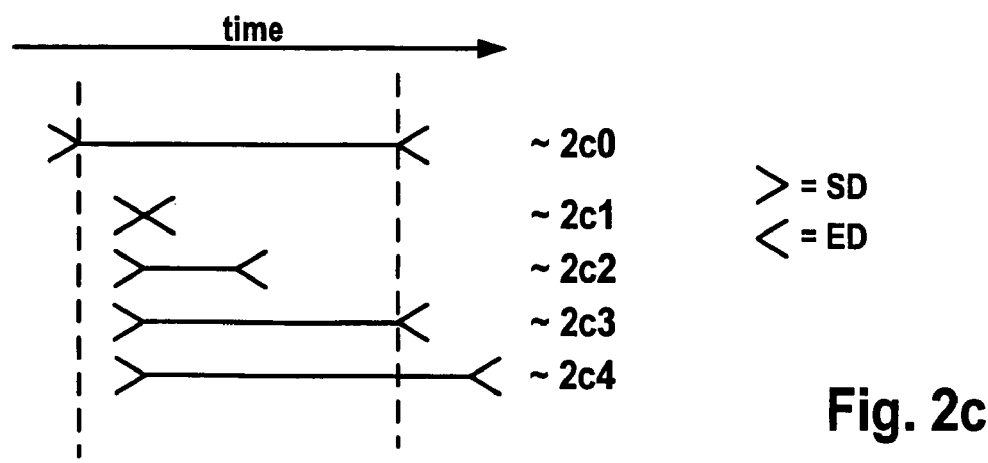

FIG. 2*c* shows the combinations that may exist when the new start date is between the previous start date and the previous end date. In this case, there are four possibilities, 2*c*1 to 2*c*4, for the new end date, as shown in FIG. 2*c*.

Figure 2D:
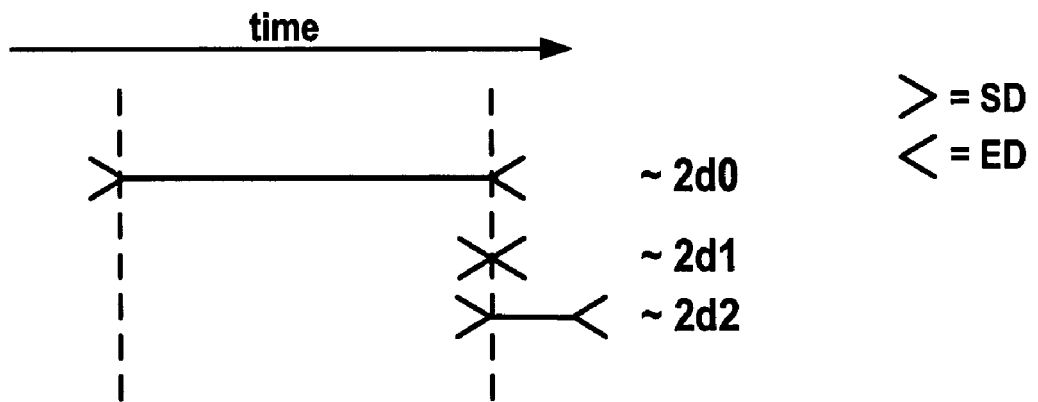

FIG. 2*d* shows the combinations that may exist when the new start date is equal to the previous end date. In this case, there are two possibilities, 2*d*1 to 2*d*2, for the new end date, as shown in FIG. 2*d*.

Figure 2E:
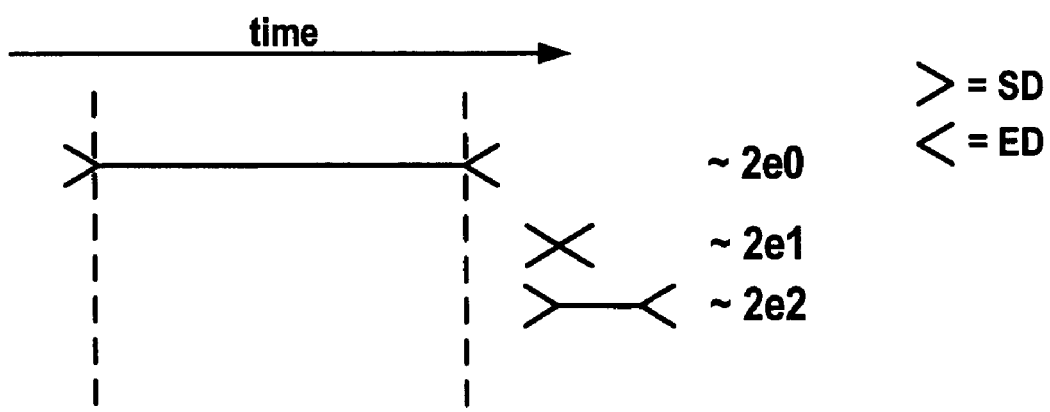

Finally, FIG. 2*e* shows the combinations when the new start date is later than the previous end date. In this case, it can be seen that there are tow possibilities, 2*e*1 to 2*e*2, for the new end date.

Figure 3A:
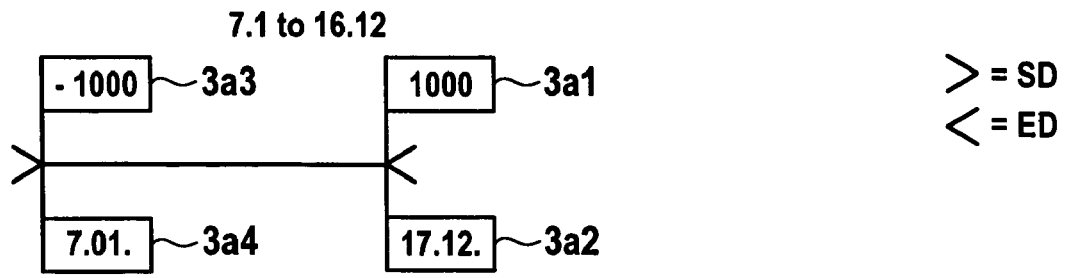
FIGS. 3a to 3f are diagrams for illustrating examples of possible update, storage, and retrieval operations of a key figure, consistent with embodiments of the invention.
Figure 3A:
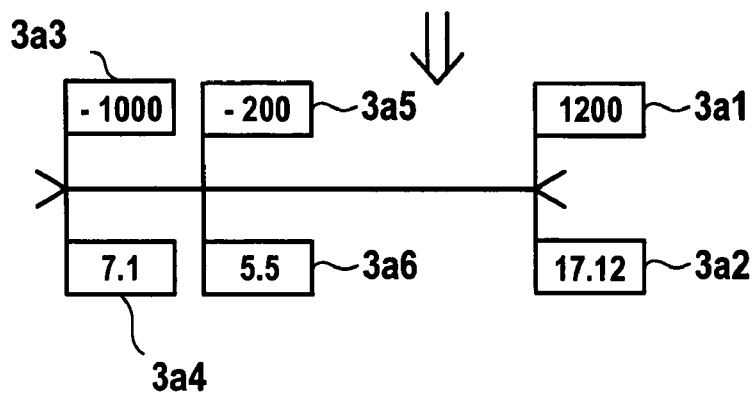

Referring now to FIG. 3*a*, exemplary embodiments of storing, updating and retrieving a key figure is explained in more detail. The starting point for FIG. 3*a* is the situation where the key figure has a value of 1000 in the period from January 7 to December 16. The key figure may then be updated to have a value of 1000 from January 7 to May 4 and a value of 1200 from May 5 to December 16. In a first step according to an embodiment of the invention, the first end value of 1000 is stored in a data field 3*a*1 and an end date later than that date, e.g., December 17 (end period day+1), 3*a*2, is assigned to that data field 3*a*1 as an end date. In a second step, the negative value of the first end value, −1000, is stored in a data field 3*a*3 and the first start date of January 7, 3*a*4, is assigned to that data field 3*a*3. This can also be interpreted as storing a delta value; namely, the difference between the previous end value, that is zero, and the new end value 1000, that is 0−1000 is equal to −1000, which is stored into the data field 3*a*3.

The process of retrieving the value of the key figure from that data can be performed, according to an embodiment of the invention, as follows: In order to retrieve the value of the key figure before January 7, say January 6, a computer program (module) has to sum up the values of the data fields having a date assigned that is later than January 6. In this case, the program has to sum up the data fields 3*a*3 and 3*a*1, that is −1000 plus 1000 is equal to 0. When retrieving the value of the key figure from January 7 on to December 16, the program has to sum up only the data field 3*a*1, yielding 1000 as a result. On December 17 the key figure is not defined, in this example. This "non definition" can be circumvented by choosing a very large date, e.g., a 31.12.9999 as the end date.

In accordance with another embodiment, the updating process may work as follows: the new value of the key figure, that is 1200 (cf. FIG. 3*a*), is stored as the (new) end value in the data field 3*a*1 having the end date 3*a*2 assigned. In addition, the difference "end value minus new end value", that is 1000−1200=−200 is stored in a data field 3*a*5 and a further start date 3*a*6, May 5 3*a*6, that is between the end date and the start date or between the end date and an other further start date, is assigned to that data field 3a5.

Performing now the retrieving process gives the following results: On January 6, the value is −1000+−200+1200=0; on January 7 it is −200+1200=1000 and from May 5 to December 16 it is 1200.

Figure 3B:
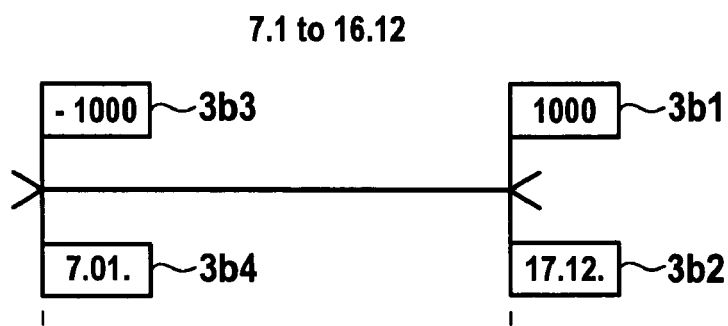
Figure 3B:
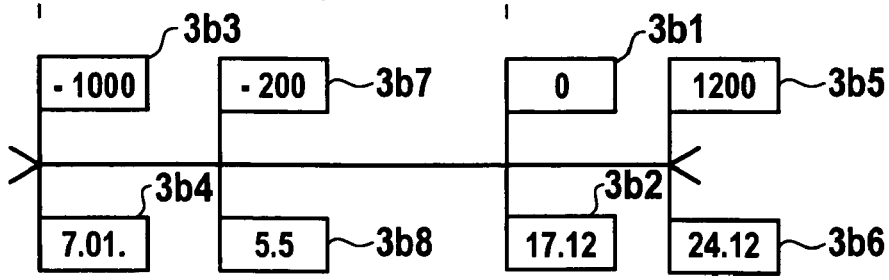

Referring now to FIG. 3b, further exemplary embodiments for storing, updating, and retrieving a key figure are explained in more detail. The starting point for FIG. 3b is a situation where the key figure has a value of 1000 from January 7 to December 16. The key figure is then updated to have a value of 1000 from January 7 to May 4 and a value of 1200 from May 5 to December 23 (period end date).

The first step of storing is identical to the one of FIG. 3a and can be left out here.

In FIG. 3b, the updating process may work as follows: the further value of the key figure is stored in a data field 3b5 and a new end date 3b6 (here +1 later than the desired end period date) is assigned to that data field 3b6; the sum of the data fields having dates assigned that are between the further start date May 5 3b8 and the new end date December 24 3b6 is calculated to 1000 (3b1 is still 1000); the difference between the further value and the sum is calculated to 1200−1000=200; the negative value of the calculated difference, that is −200 is stored in a data field 3b7 and the further start date May 5 3b8 is assigned to that data field 3b7; and the value(s) of the data field(s) 3b1 having a date(s) assigned that is (are) between the further start date 3b8 and the new end date 3b6 are set to zero.

Performing now the retrieving process gives the following results: On January 6, the value is −1000+−200+0+1200=0; on January 7 it is −200+0+1200=1000 and from May 5 to December 23 it is 0+1200=1200.

Figure 3C:
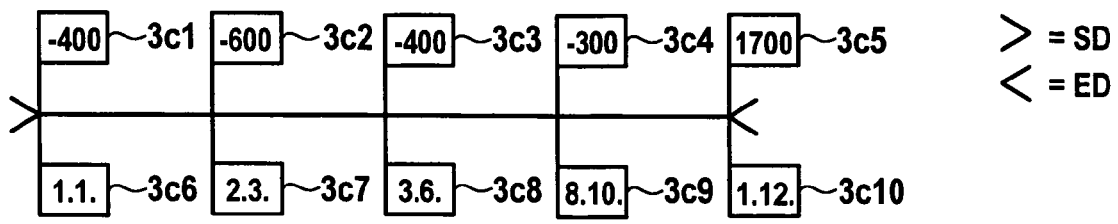
Figure 3C:
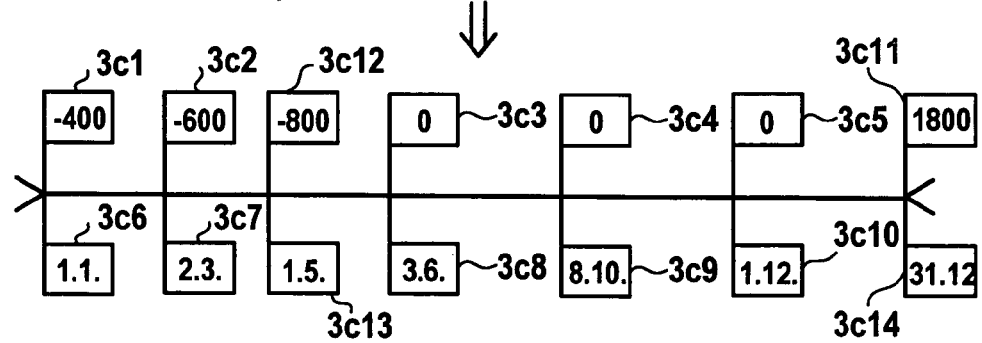

Referring now to FIG. 3c, further exemplary embodiments for storing, updating and retrieving a key figure are explained in more detail. The starting point for FIG. 3c is the situation where the key figure has a value of 400 (=1700 (data field 3c5)+−300 (data field 3c4)+−400 (data field 3c3)+−600 (data field 3c2)) from January 1 to March 1, similarly a value of 1000 from March 2 to June 2, a value of 1400 from June 3 to October 7 and a value of 1700 from October 8 to December 1. The key figure may then be updated to have a value of 1800 from May 1 to December 30.

The updating process may work as follows: the further value of the key figure is stored in a data field 3c11 and a new end date 3c14 (in this example +1 to the desired end period date) is assigned to that data field 3c11; the sum of the data fields 3c3 to 3c5 having dates assigned that are between the further start date May 1 3c13 and the new end date December 31 3c14 is calculated to 1000 (3c5 is still 1000); the difference between the further value and the sum is calculated to 1800−1000=800; the negative value of the calculated difference, that is −800 is stored in a data field 3c12 and the further start date May 5, 3c13, is assigned to that data field 3c12; and the values of the data fields 3c3 to 3c5 having dates assigned that are between the further start date 3c13 and the new end date 3c14 are set to zero, as shown in FIG. 3c. After that updating procedure, the new end date is the end date, and the previous end date is a further start date.

Performing now the retrieving process gives the following results: On January 6, the value is −600+−800+0+0+1800=400; on May 1 its 0+0+0+1800=1800; and on December 30 it is 1800.

Figure 3D:
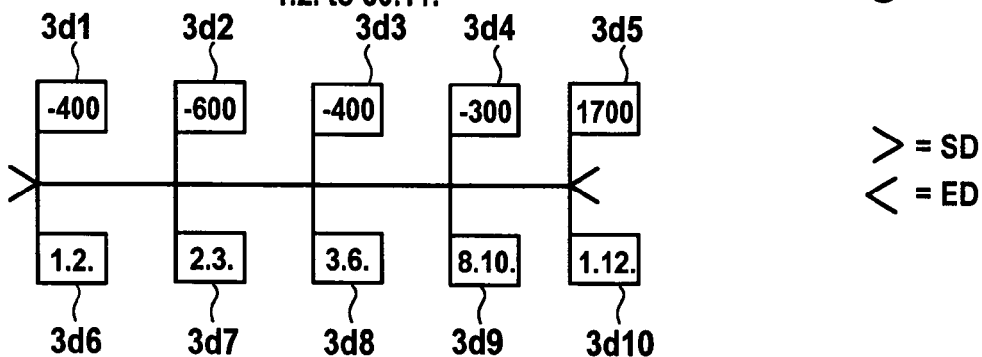
Figure 3D:
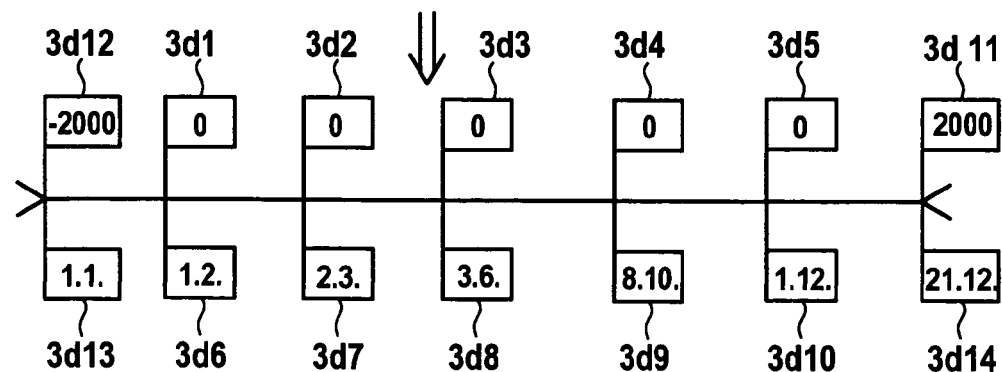

Referring now to FIG. 3d, further exemplary embodiments of storing, updating, and retrieving a key figure are explained in more detail. In FIG. 3d, the starting point is the situation where the key figure has a value of 400 (=1700 (data field 3c5)+−300 (data field 3c4)+−400 (data field 3c3)+−600 (data field 3c2)) from February 1 to March 2, similarly a value of 1000 from March 3 to June 2, a value of 1400 from June 3 to October 7 and a value of 1700 from October 8 to December 1. The key figure may then be updated to have a value of 2000 from a new start date January 1 to a new period end date December 20.

As shown in FIG. 3d, the updating process may work as follows: the further value of the key figure is stored in a data field 3d11 and the new end date 3d14 (in this example +1 to the desired end period date) is assigned to that data field 3d11; the sum of the data fields 3d1 to 3d5 having dates assigned that are between the new start date January 1 3d13 and the new end date December 21, 3d14, is calculated to 0; the difference between the further value and the sum is calculated to 2000−0=2000; the negative value of the calculated difference, that is −2000, is stored in a data field 3d12 and the new start date January 1 3d13 is assigned to that data field 3d12; and the values of the data fields 3d1 to 3d5 having dates assigned that are between the further start date 3d13 and the new end date 3d14 are set to zero. After that updating procedure, the new end date is the end date, the previous end date is a further start date, the previous start date is a further start date and the new start date is the start date.

The retrieving process may work in the same way as already described above.

Figure 3E:
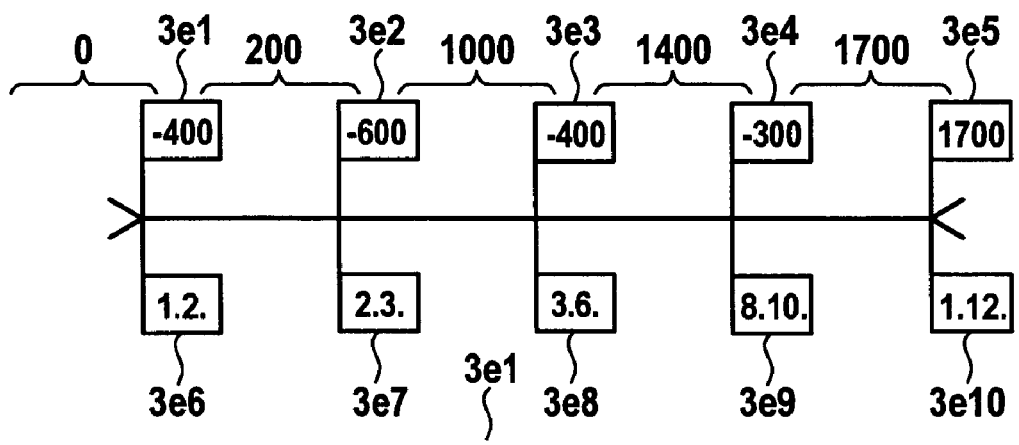
Figure 3E:
Figure 3E:
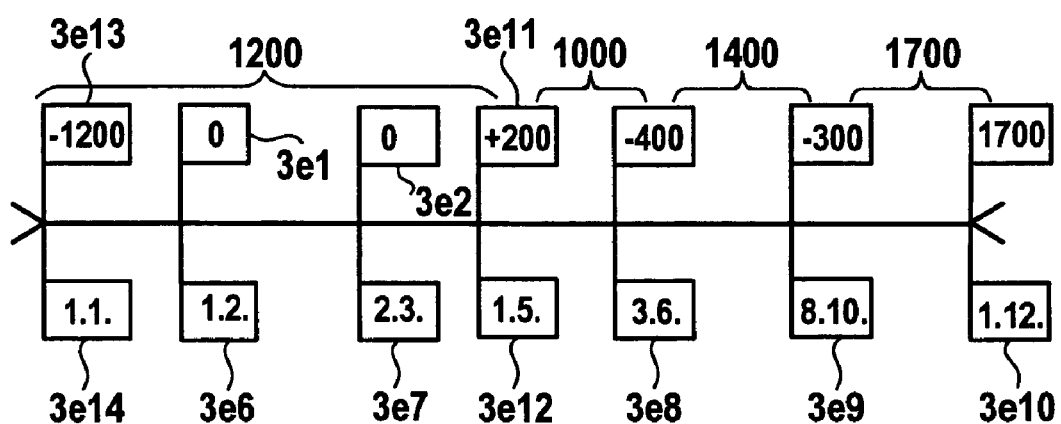

Referring now to FIG. 3e, still further exemplary embodiments for storing, updating, and retrieving a key figure are explained in more detail. For FIG. 3e, the starting point is the situation where the key figure has a value of 400 (=1700 (data field 3e5)+−300 (data field 3e4)+−400 (data field 3e3)+−600 (data field 3e2)) from February 1 to March 2, similarly a value of 1000 from March 3 to June 2, a value of 1400 from June 3 to October 7 and a value of 1700 from October 8 to November 30. The key figure shall then be updated to have a further value of 1200 from a new start date January 1 to an intermediate period end date April 30.

In FIG. 3e, the updating process may work as follows: the sum of the data fields (3e3 to 3e5) having a date assigned that is later than the intermediate end date (3e8 to 3e10) is calculated, yielding 1000 in this example; the negative difference between the calculated sum and the further value, that is +200 in this example, is stored in a data field 3e11 and an intermediate end date May 1, 3e12, is assigned to that data field 3e11; the negative value of the further value (−1200) is stored in a data field 3e13 and the new start date January 1 3e14 is assigned to that data field 3e13; and the data fields having dates assigned that are between the new start date and the intermediate end date are set to zero. After that updating procedure, the intermediate end date and the start date are further start dates and the new start date is the start date.

The retrieving process may work in the same way as already described above.

Figure 3F:
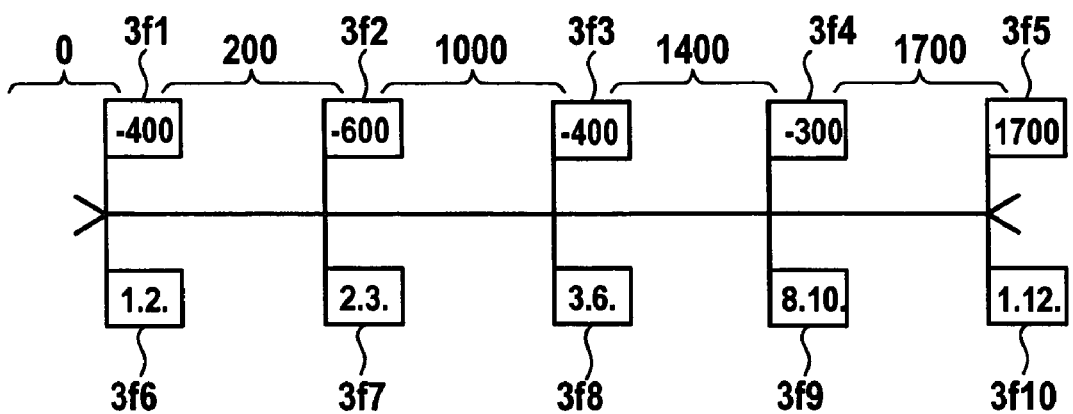
Figure 3F:
Figure 3F:
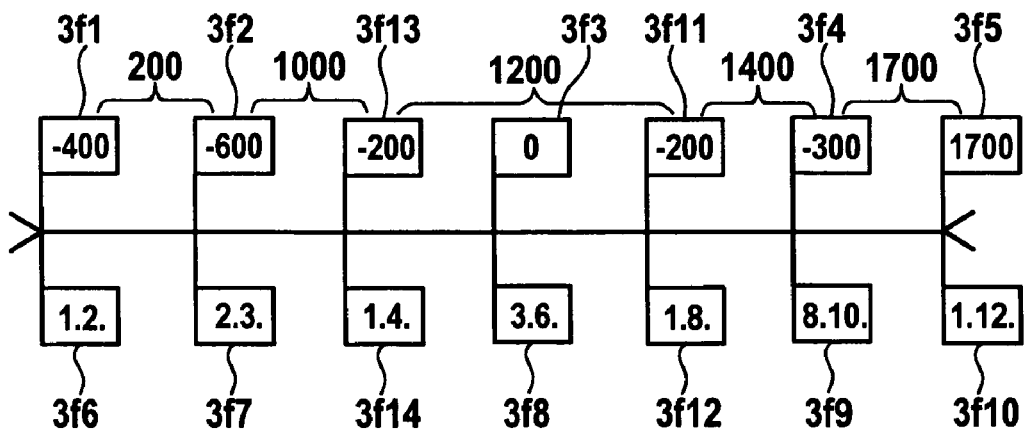

Referring now to FIG. 3f, further exemplary embodiments for storing, updating, and retrieving a key figure are explained in more detail. Starting point is the situation where the key figure has a value of 400 (=1700 (data field 3/5)+−300 (data field 3/4)+−400 (data field 3/3)+−600 (data field 3/2)) from February 1 to March 2, similarly a value of 1000 from March 3 to June 2, a value of 1400 from June 3 to October 7 and a value of 1700 from October 8 to November 30. The key figure shall then be updated to have a further value of 1200 from a further start date April 1 to an intermediate end date July 31.

In FIG. 3f, the updating process may work as follows: the sum of the data fields (3/5 to 3/5) having a date assigned that is later than the intermediate end date (3/9 to 3/10) is calculated, yielding to 1400 in this example; the negative difference between the calculated sum and the further value, that is −200 in this example, is stored in a data field 3/11 and a date according to intermediate end date+1, that is August 1 in this example 3/12 is assigned to that data field 3/11; the sum of the data fields having a date assigned that is earlier than the further start date (3/1 to 3/2, 3/6 to 3/7) is calculated, yielding to −1000 in this example; the negative value of said sum and the further value, that is—(−1000+1200)=−200 is stored in a data field 3/13 and a date according to the new start date, that is April 1, 3/14, is assigned to that data field 3/13; and the data fields having dates assigned that are between the new start date and the intermediate end date (3/3, 3/8) are set to zero. After that updating procedure, the intermediate end date and the further start date are further start dates.

The retrieving process works in the same way as already described above.

In the following paragraphs, further embodiments of the invention are explained in more detail by making reference to FIGS. 4, 5 and 6a to 6h.

Figure 4:
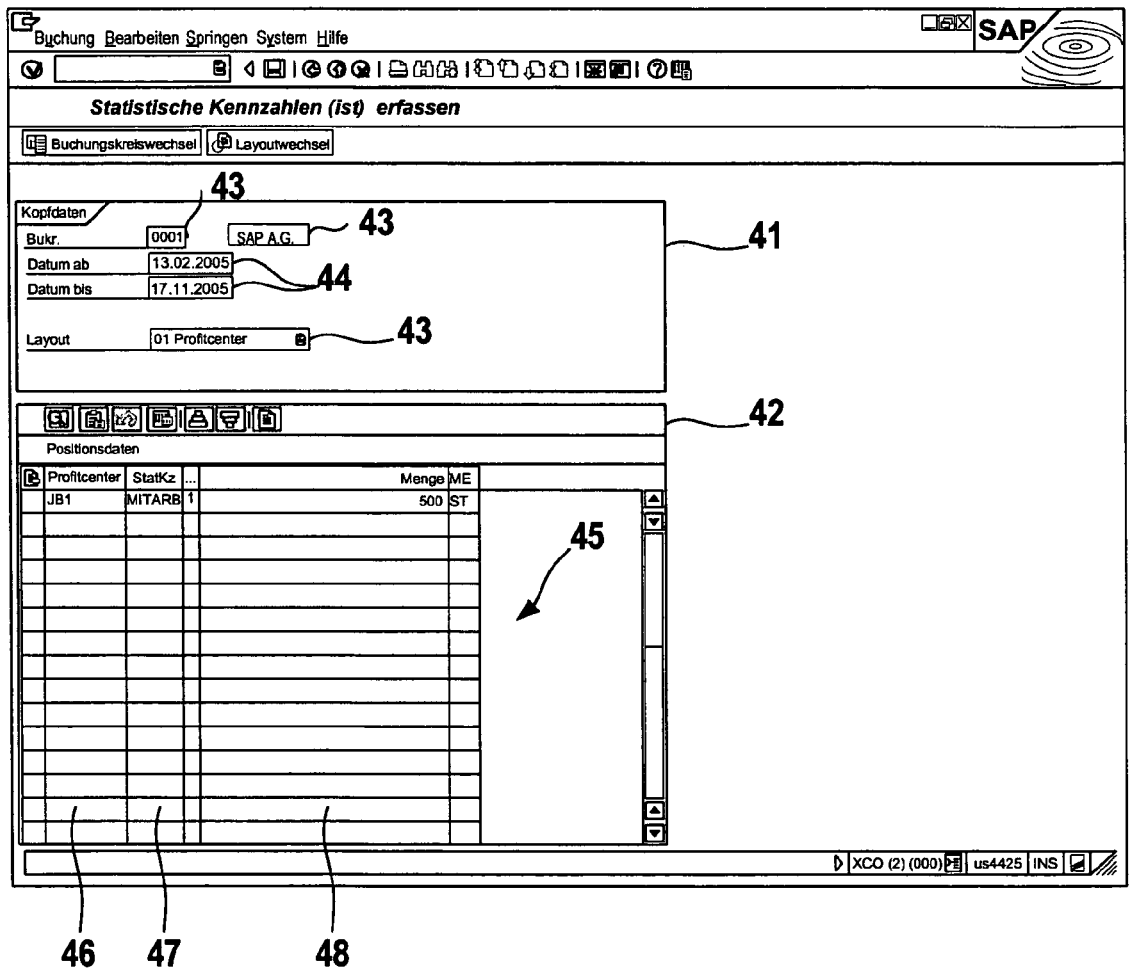
FIG. 4 illustrates an exemplary user interface for entering a value of a key figure for a certain time period, consistent with an embodiment of the invention.

FIG. 4 shows an exemplary graphical user interface for entering data for a key figure. The user interface comprises a header section 41 and a body section 42. The header section 41 comprises one or more data fields 43 for entering general data indicative of the area to which the key figure belongs. The header section 41 further comprises two data fields 44 for entering a start date (e.g., Feb. 13, 2005) and a period end date (e.g., Nov. 17, 2005), to which a specific value of the key figure belongs. The body section 42 comprises a table 45 for entering specific values of specific key figures for specific sub-areas for the time period specified in the header 41, 44.

As shown in the exemplary embodiment of FIG. 4, table 45 comprises a first column 46 in which a specific sub-area can be specified or selected. Table 45 also includes a second column 47 in which a name of the key figure can be entered or selected and a column 48 in which the value of the key figure can be entered.

Figure 5:
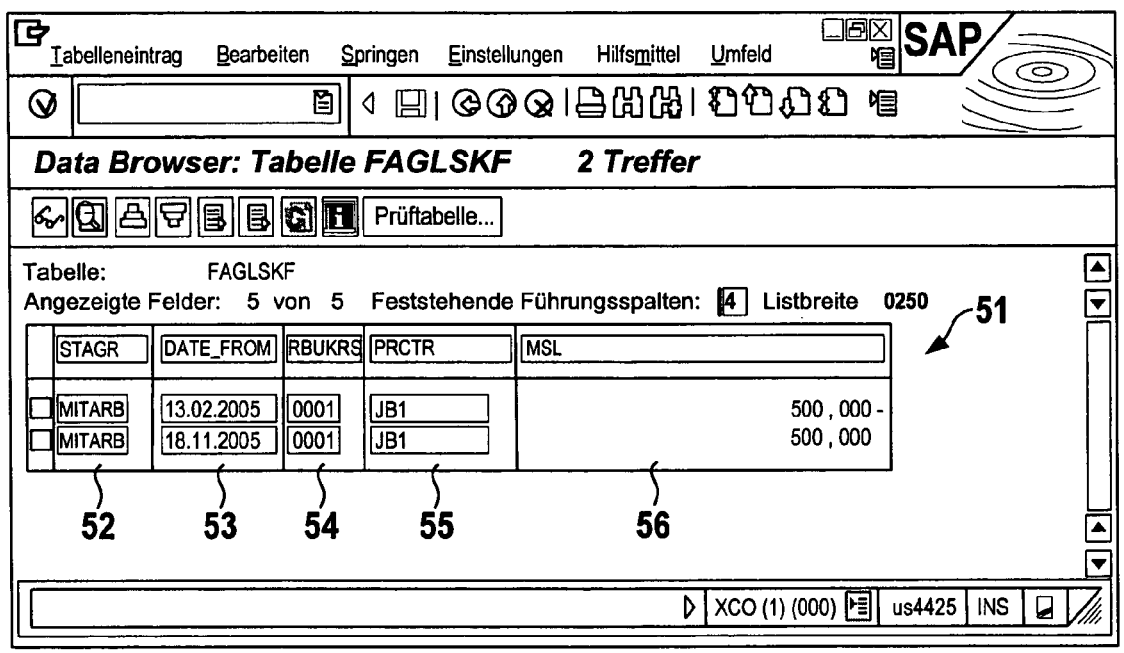
FIG. 5 illustrates an exemplary table having entries of values of a key figure after a first data entry, consistent with an embodiment of the invention.

FIG. 5 shows another exemplary graphical user interface indicating the data set of the key figure after entering the data according to, for example, the graphical user interface of FIG. 4 on a computer screen. In FIG. 5, the data of the key figure are shown in a table 51. Table 51 comprises a first column 52 in which the name of the key figure is displayed, a second column 53 in which dates belonging to the key figure are displayed, a third column 54 in which information indicative on the area the key figure belongs to is displayed, a column 55 which indicates an organizational unit, and a column 56 in which values and delta values of the key figure are displayed. In this example, the data field of column 56 second line contains a value of 500. Since the date of November 18 (resulting from the end date+1 of FIG. 4 or Nov. 17, 2005+1), 2005 is contained in the data field of column 53 second line, this date is assigned to the value of 500. In the same way, the date of Feb. 13, 2005 is assigned to the delta values of −500.

Figure 6A:
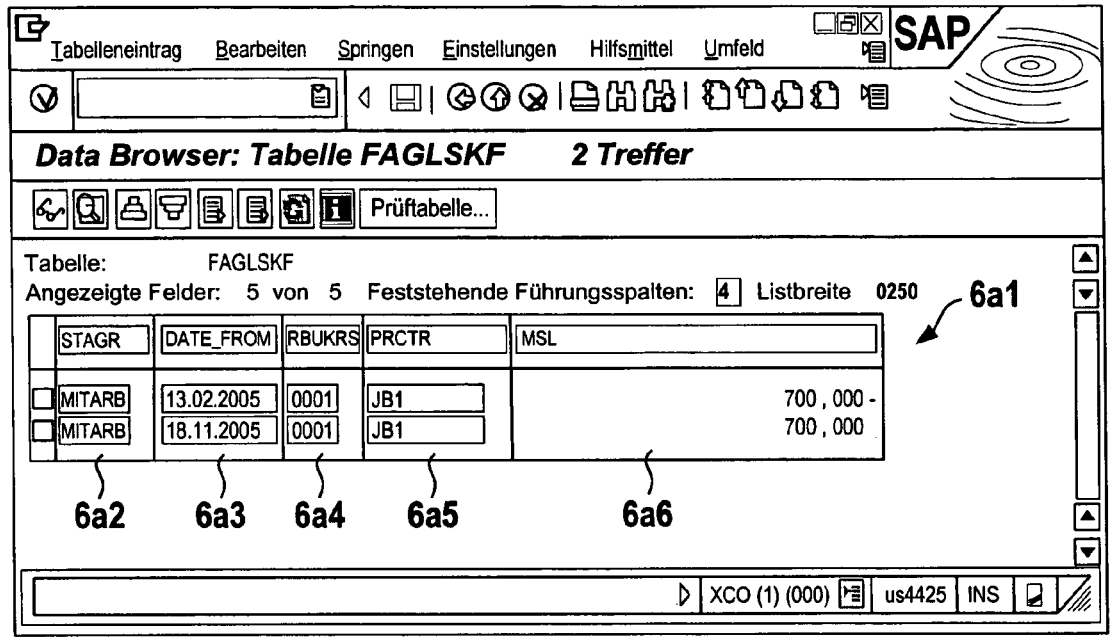

FIG. 6a shows an example of the data set after a first update: the value of the key figure is updated from 500 to 700 for the same time period. The data fields having the same date assigned as in the foregoing example are updated by 700 and −700, respectively.

The reference signs of this and the following figures are chosen in accordance with the ones in FIG. 5.

Figure 6B:
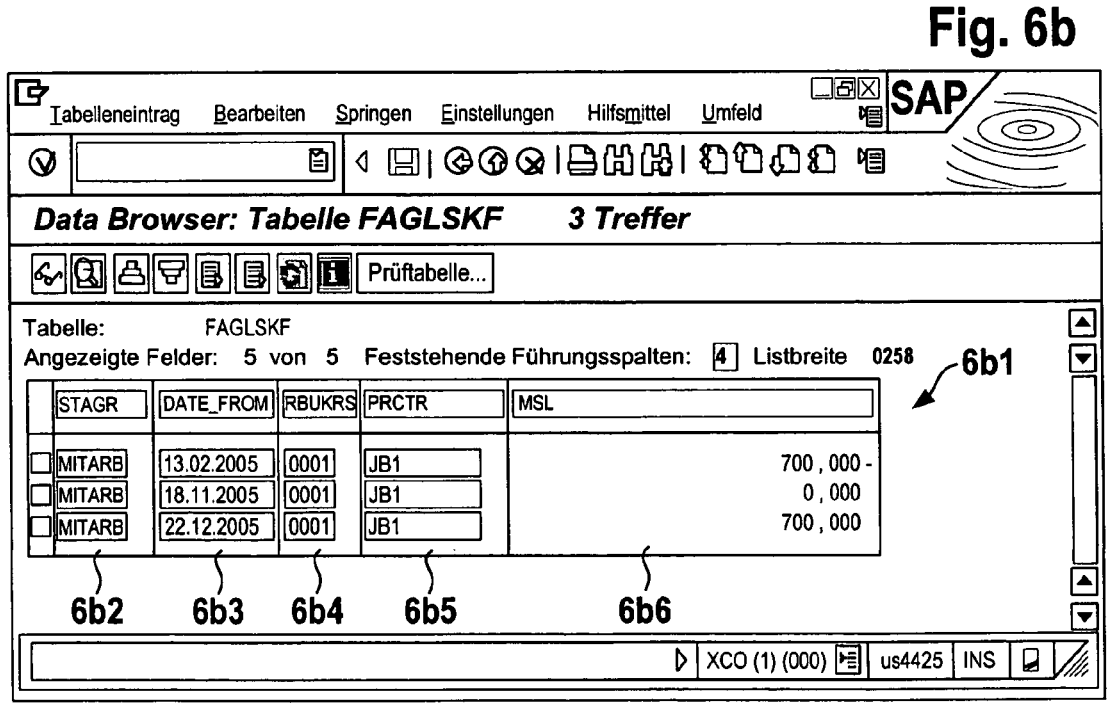

FIG. 6b shows an example of the data set after a second update: the time period for the key figure having the value 700 has been extended from Nov. 18, 2005 to Dec. 21, 2005. The value of 700 has been entered in a new data field (column 6b6, line three) and the new end date of Dec. 22, 2005 (December 21+1) has been assigned to that new data field by entering that date into the data field of column 6b2 line 3. The data field of the previous end date, column 6b6 line 2, has been set to zero.

FIG. 6c shows an example of the data set of the key figure referred to in FIG. 6a after a second update different to that of FIG. 6b: the time period for the key figure having the value 700 has been reduced from Feb. 13, 2005 to Aug. 5, 2005 and for the time from Aug. 6, 2005 to Nov. 17, 2005, the key figure shall have a value of 500. The value of 500 has been entered in the data field (column 6c6, line three) having the date of Nov. 18, 2005 assigned. The negative value of the difference between 500 and 700, that is 200, has been entered in a new data field (a new line 2 has been inserted) and the date of Aug. 6 (Aug. 5, 2005+1) has been assigned to that new data field.

FIG. 6d shows an example of the data set of the key figure referred to in FIG. 6a after a second update different to that of FIGS. 6b and 6c: the time period for the key figure having the value 700 has been reduced to range from Apr. 13, 2005, to Nov. 17, 2005 and for the time from Feb. 13, 2005 to Apr. 12, 2005 (a first period end date), the key figure shall have a value of 500. The value of 700 remains unchanged in the data field (column 6d6, line three) having the date of Nov. 18, 2005 assigned. The negative value of the difference between 700 and 500, that is −200, has been entered in a new data field (a new line 2 has been inserted) and the date of April 13 (Apr. 12, 2005+1) has been assigned to that new data field.

Figures 6E, 6F:
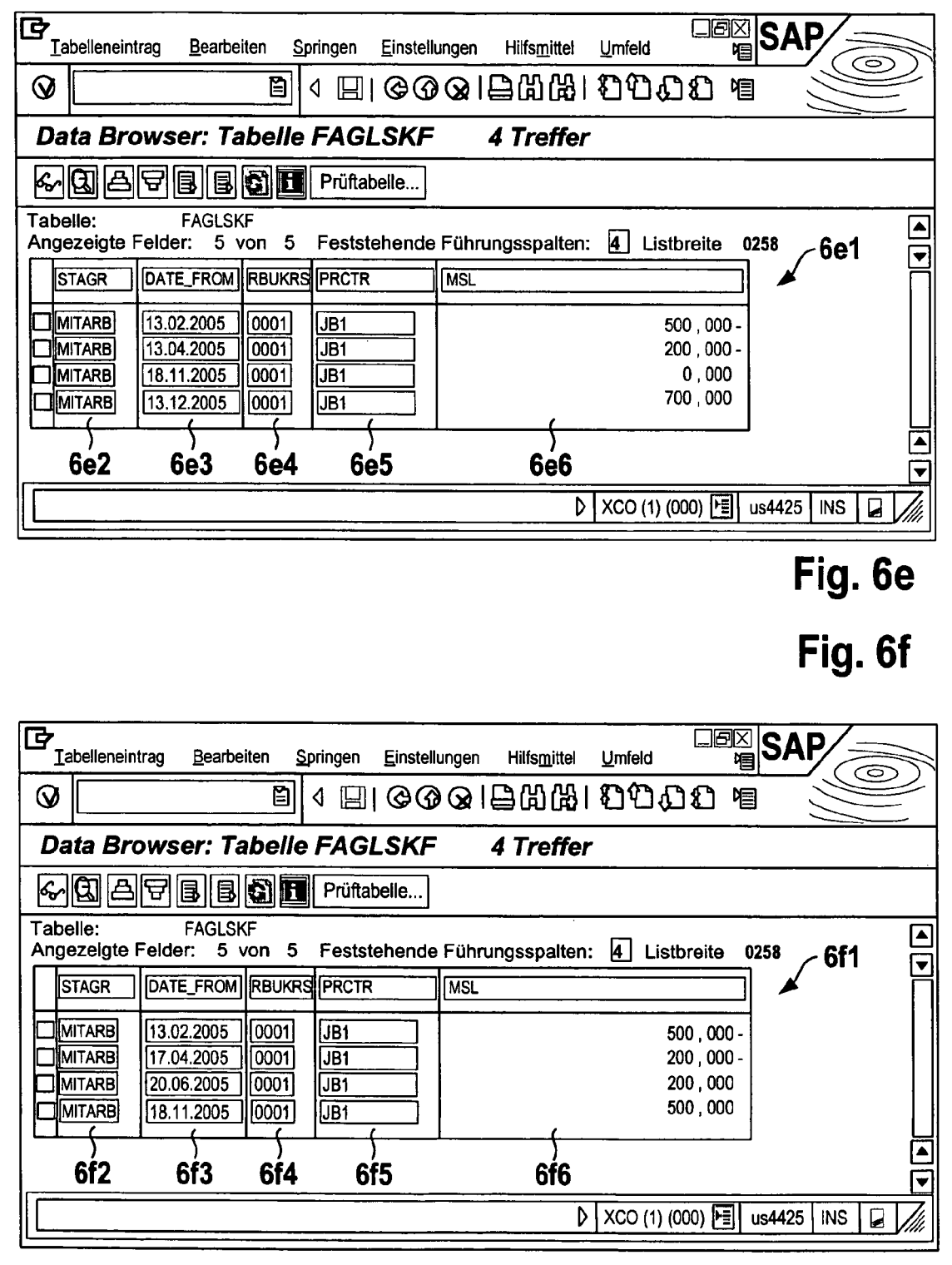

FIG. 6e shows an example of the data set of the key figure referred to in FIG. 6a after a second update different to that of FIGS. 6b, 6c and 6d: the time period for the key figure having the value 700 has been changed to range from Apr. 13, 2005, to Dec. 12, 2005 and for the time from Feb. 13, 2005 to Apr. 12, 2005 (period end date), the key figure shall have a value of 500. The value of 700 is entered in a new data field (column 6e6, line 4) having the new end date+1=Dec. 13, 2005 assigned. The negative value of the difference between 700 and 500, that is −200, has been entered in a new data field in column 6e5 (a new line 2 has been inserted) and the date of April 13 (Apr. 12, 2005+1) has been assigned to that new data field. The data field, which has the date of the previous end date+1=Nov. 18, 2005 assigned, is set to 0.

FIG. 6f shows an example of the data set of the key figure referred to in FIG. 6a after a second update different to that of FIGS. 6b, 6c, 6d and 6e: the time period for the key figure having the value 700 has been changed to range from Apr. 17, 2005, to Jun. 19, 2005 and for the time from Feb. 13, 2005 to Apr. 16, 2005, and from Jun. 20, 2005 to Nov. 17, 2005, the key figure shall have a value of 500 (new end value), respectively. The value of 500 is entered in the data field (column 6e6, line 4) having the end date Nov. 18, 2005 assigned. The negative value of the difference between 500 and 700, that is 200, has been entered in a new data field in column 6/5 (a new line 3 has been inserted) and the date of June 20 has been assigned to that new data field (line 3 of 6/1). Further, the negative value of the difference between 700 and 500, that is −200, has been entered in a new data field in column 6/5 (a new line 2 has been inserted) and the date of Apr. 17, 2005 (Apr. 16, 2005+1) has been assigned to that new data field (line 2 of 6/1). The negative value of the end value=−500 has been entered into the data field, which has the date Feb. 13, 2005 assigned (line 1 of 6/1).

FIG. 6g shows an example of the data set of the key figure referred to in FIG. 6a after a second update different to that of FIGS. 6b, 6c, 6d, 6e, and 6f: the time period for the key figure having the value 700 (end value) has been changed to range from Jan. 17, 2005, to Dec. 12, 2005. The value of 700 is entered in a new data field (column 6/6, line 4) having the new end date Dec. 13, 2005 assigned. The negative value of the end value, that is −700, has been entered in a new data field in column 6e5 (a new line 1 has been inserted) and the start date of January 17 has been assigned to that new data field. The data fields, which have dates assigned that are between the new start date and the new end date, are set to zero.

FIG. 6h shows an example of the data set of the key figure referred to in FIG. 5 after a first update: the key figure shall be updated to have a value of 700 in a new time period ranging from Nov. 30, 2005 to Dec. 8, 2005. The key figure is 0 between this time period and the old time period. The value of 700 is entered in a new data field (column 6h6, line 4) having the new end date Dec. 9, 2005 assigned. The negative value of the end value, that is −700, has been entered in a new data field in column 6e5 (a new line 3 has been inserted) and a start date of Nov. 30, 2005 has been assigned to that new data field. The other data fields remain unchanged.

Modifications and adaptations of the present invention will be apparent to those skilled in the art from consideration of the specification and practice of the embodiments and features disclosed herein. The foregoing description of has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, the described implementation includes software, but systems and methods consistent with the present invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, for example, hard disks, floppy disks, or CD-ROM; the Internet or other forms of RAM or ROM.

Computer programs based on the written description and flow charts of embodiments of the invention are within the skill of an experienced developer. The various programs or program modules can be created using any of the techniques known to one skilled in the art or can be designed in connection with existing software. For example, programs or program modules can be designed in or by means of Java, C++, HTML, XML, or HTML with included Java applets or in SAP R/3 or ABAP. One or more of such modules can be integrated in existing e-mail or browser software.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Further, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

Other embodiments of the invention will be apparent to those skilled in the art from consideration of the specification and practice of the invention disclosed herein. It is intended, therefore, that the specification and examples be considered as exemplary only, with a true scope and spirit of the invention being indicated by the following claims.

What is claimed is:

1. A computer-implemented method of storing values of a variable key figure over time, the method comprising:
   displaying, on a display device, a graphical user interface including:
      a header section identifying an area to which the key figure belongs, wherein the header section includes a first data field for receiving a start date corresponding to the key figure and a second data field for receiving a period end data corresponding to the key figure; and
      a body section including a table having a first column for displaying a name of the key figure, a second column for displaying dates corresponding to the key figure, a third column for displaying information identifying the area the key figure belongs to, a fourth column for identifying an organizational unit using the key figure, and a fifth column for identifying a numeric value of the key figure and a numeric delta value of the key figure;
   storing, by a processor, a first end value of the key figure in a first data field;
   assigning, by the processor, an end date to the first data field;
   storing, by the processor, a delta value of the key figure in a second data field;
   assigning, by the processor, a start date to the second data field;
   updating, by the processor, the value of the key figure in the first data field by storing a new end value of the key figure in the first data field wherein the new end value is equal to a difference between the first end value and the delta value; and
   adjusting, by the processor, the updated value of the key figure when the end date is not equal to a period end date to account for a change in the updated value of the key figure during a time period between the end date and the period end date,
   wherein the delta value is equal to a difference between the new end value and a negative of the first end value, and
   wherein the start date is an earlier date than the end date.

2. A computer-implemented method of storing values of a variable key figure over time, the method comprising:
   displaying a graphical user interface including:
      a header section identifying an area to which the key figure belongs, wherein the header section includes a first data field for receiving a start date corresponding to the key figure and a second data field for receiving a period end data corresponding to the key figure; and
      a body section including a table having a first column for displaying a name of the key figure, a second column for displaying dates corresponding to the key figure, a third column for displaying information identifying the area the key figure belongs to, a fourth column for identifying an organizational unit using the key figure, and a fifth column for identifying a numeric value of the key figure and a numeric delta value of the key figure;
   storing, by a processor, a first end value of the key figure in a first data field;
   assigning, by the processor, an end date to the first data field;
   storing, by the processor, a negative value of the first end value in a second data field;
   assigning a first start date to the second data field;

storing a delta value in a third data field;
assigning a new start date to the third data field;
updating the value of the key figure in the first data field by storing a new end value of the key figure in the first data field wherein the new end value is equal to a difference between the first end value and the delta value; and
adjusting the updated value of the key figure when the end date is not equal to a period end date to account for a change in the updated value of the key figure during a time period between the end date and the period end date, wherein the end date is later than the new start date.

3. A computer-implemented method for updating a key figure, the method comprising:
   displaying a graphical user interface including:
      a header section identifying an area to which the key figure belongs, wherein the header section includes a first data field for receiving a start date corresponding to the key figure and a second data field for receiving a period end data corresponding to the key figure; and
      a body section including a table having a first column for displaying a name of the key figure, a second column for displaying dates corresponding to the key figure, a third column for displaying information identifying the area the key figure belongs to, a fourth column for identifying an organizational unit using the key figure, and a fifth column for identifying a numeric value of the key figure and a numeric delta value of the key figure;
   storing, by a processor, a first end value of the key figure in a first data field;
   assigning, by the processor, an end date to the first data field;
   storing, by the processor, a negative value of the first end value in a second data field;
   assigning, by the processor, a first start date to the second data field, wherein:
      the end date is later than the first start date,
      a new end date is later than the end date, and
      a second start date is earlier than the end date;
   storing, by the processor, a second end value in a third data field;
   assigning, by the processor, the new end date to the third data field;
   calculating, by the processor, a sum of the data fields with assigned dates that are between the second start date and the new end date;
   calculating, by the processor, a first difference between the second value and the sum;
   storing, by the processor, a negative value of the second difference in a fourth data field;
   assigning, by the processor, the second start date to the fourth data field;
   updating values of one or more data fields with assigned dates that are later than the second start date and earlier than the new end date to zero wherein the second end value is equal to the difference between the first end value and the first difference; and
   adjusting, by the processor, the updated values of the one more data fields when the new end date is not equal to a period end date to account for a change in the updated values of the one or more data fields during a time period between the end date and the period end date.

4. A computer-implemented method for updating a key figure, the method comprising:
   displaying a graphical user interface including:
      a header section identifying an area to which the key figure belongs, wherein the header section includes a first data field for receiving a start date corresponding to the key figure and a second data field for receiving a period end data corresponding to the key figure; and
      a body section including a table having a first column for displaying a name of the key figure, a second column for displaying dates corresponding to the key figure, a third column for displaying information identifying the area the key figure belongs to, a fourth column for identifying an organizational unit using the key figure, and a fifth column for identifying a numeric value of the key figure and a numeric delta value of the key figure;
   storing, by a processor, a first value of the key figure in a first data field;
   assigning, by the processor, a first end date to the first data field;
   storing, by the processor, a second value in a second data field;
   storing, by the processor, a second end value in a second data field;
   assigning, by the processor, a second end date to the second data field, wherein the second end date is later than the first end date;
   calculating, by the processor, a sum of data fields having dates assigned that are between a new start date and the second end date, wherein the new start date is earlier than the first end date;
   calculating, by the processor, a first difference between the second end value and the sum;
   storing, by the processor, a negative of the first difference in a third data field;
   assigning, by the processor, the new start date to the fourth data field;
   updating, by the processor, values of one or more data fields with assigned dates that are later than the new start date and earlier than the second end date to zero; and
   adjusting, by the processor, the updated values of one or more data fields when the second end date is not equal to a period end date to account for a change in the updated values of the one or more data fields during a time period between the second end date and the period end date.

5. A computer-implemented method for updating a variable key figure, the method comprising:
   displaying a graphical user interface including:
      a header section identifying an area to which the key figure belongs, wherein the header section includes a first data field for receiving a start date corresponding to the key figure and a second data field for receiving a period end data corresponding to the key figure; and
      a body section including a table having a first column for displaying a name of the key figure, a second column for displaying dates corresponding to the key figure, a third column for displaying information identifying the area the key figure belongs to, a fourth column for identifying an organizational unit using the key figure, and a fifth column for identifying a numeric value of the key figure and a numeric delta value of the key figure;
   storing, by a processor, a first end value of the key figure in a first data field;
   assigning, by the processor, an end date to the first data field;
   storing, by the processor, a negative value of the first end value in a second data field;
   assigning, by the processor, a first start date to the second data field, wherein the end date is later than the first start date;

storing, by the processor, a new end value of the key figure as the end value in the first data field;

storing, by the processor, a difference between the first end value and the new end value in a third data field;

assigning, by the processor, a second start date that is between the end date and the first start date to the third data field;

updating the value of the key figure in the first data field to equal a sum of data fields having dates assigned that are between the first start date and the second end date; and adjusting, by the processor, the updated value of the key figure when the second end date is not equal to a period end date to account for a change in the updated value of the key figure during a time period between the second end date and the period end date.

6. A computer system, comprising:

a memory device;

a processor coupled to the memory device, wherein the memory device stores a program for controlling the processor, and wherein the processor, being operative with the program, is configured to:

store a first end value of the key figure in a first data field;

assign an end date to the first data field;

store a delta value of the key figure in a second data field;

assign a start date to the second data field;

update the value of the key figure in the first data field by storing a new end value of the key figure in the first data field, wherein the new end value is equal to a difference between the first end value and the delta value; and adjust the updated value of the key figure when the end date is not equal to a period end date to account for a change in the updated value of the key figure during a time period between the end date and the period end date, wherein the delta value is equal to a difference between the new end value and a negative of the first end value, and wherein the start date is an earlier date than the end date; and a display device for displaying a graphical user interface including:

a header section identifying an area to which the key figure belongs, wherein the header section includes a first data field for receiving a start date corresponding to the key figure and a second data field for receiving a period end data corresponding to the key figure; and a body section including a table having a first column for displaying a name of the key figure, a second column for displaying dates corresponding to the key figure, a third column for displaying information identifying the area the key figure belongs to, a fourth column for identifying an organizational unit using the key figure, and a fifth column for identifying a numeric value of the key figure and a numeric delta value of the key figure.

7. A non-transitory computer-readable storage medium comprising a set of instructions which, when executed by a processor, perform a method for storing values of a variable key figure over time, the method comprising:

displaying a graphical user interface including:

a header section identifying an area to which the key figure belongs, wherein the header section includes a first data field for receiving a start date corresponding to the key figure and a second data field for receiving a period end data corresponding to the key figure; and a body section including a table having a first column for displaying a name of the key figure, a second column for displaying dates corresponding to the key figure, a third column for displaying information identifying the area the key figure belongs to, a fourth column for identifying an organizational unit using the key figure, and a fifth column for identifying a numeric value of the key figure and a numeric delta value of the key figure;

storing a first end value of the key figure in a first data field;

assigning an end date to the first data field;

storing a delta value of the key figure in a second data field;

assigning a start date to the second data field;

updating, by the processor, the value of the key figure in the first data field by storing a new end value of the key figure in the first data field wherein the new end value is equal to a difference between the first end value and the delta value; and adjusting, by the processor, the updated value of the key figure when the end date is not equal to a period end date to account for a change in the updated value of the key figure during a time period between the end date and the period end date, wherein the delta value is equal to a difference between the new end value and a negative of the first end value, and wherein the start date is an earlier date than the end date.

* * * * *